United States Patent [19]
Nielsen

[11] Patent Number: 6,139,370
[45] Date of Patent: Oct. 31, 2000

[54] SHOCK RESISTANT ELECTRICAL SOCKET AND PLUG

[76] Inventor: Erling C. Nielsen, 1109 Duke Dr., Woodbridge, N.J. 07095-3835

[21] Appl. No.: 09/383,678

[22] Filed: Aug. 26, 1999

[51] Int. Cl.[7] .......................... H01R 13/625; H01R 24/04
[52] U.S. Cl. ............................................ 439/669; 439/332
[58] Field of Search .................................... 439/108, 101, 439/668, 669, 332

[56] References Cited

U.S. PATENT DOCUMENTS

| | | | |
|---|---|---|---|
| 3,585,575 | 6/1971 | De Vito | 339/182 |
| 3,829,814 | 8/1974 | Straus | 339/14 R |
| 4,715,507 | 12/1987 | Chamberlin | 220/3.94 |
| 5,893,766 | 4/1999 | Bellas et al. | 439/95 |
| 5,964,623 | 10/1999 | Maher et al. | 439/668 |

Primary Examiner—Brian Sircus
Assistant Examiner—Chandrika Prasad

[57] ABSTRACT

A electrical socket and plug for delivering electrical current in a safer manner by grounding the entrance of the socket. The electrical socket and plug includes a plug in the shape of a cylinder with conductive portions therein. The socket is a hollow cylinder designed to accept the male and containing corresponding conductive portions. The opening of the socket contains the ground conductor. The ground conductor closes the opening of the socket. Any item placed in the socket must touch the ground thus reducing art risk of electric shock

5 Claims, 2 Drawing Sheets

SHOCK RESISTANT ELECTRICAL SOCKET AND PLUG

BACKGROUND OF THE INVENTION

1. Field of the Invention

The present invention relates to electrical female and male connector assemblies and more particularly pertains to a new electrical socket and plug for delivering electrical current in a safer manner by grounding the entrance of the socket.

2. Description of the Prior Art

The use of electrical female and male connector assemblies is known in the prior art. More specifically, electrical female and male connector assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,829,814; U.S. Pat. No. 3,843,854; U.S. Pat. No. 4,223,969; U.S. Pat. No. 3,644,867; U.S. Pat. No. 4,636,022; and U.S. Pat. No. 4,941,837.

While these devices fulfill their respective, particular objectives and requirements, the aforementioned patents do not disclose a new electrical socket and plug. The inventive device includes a plug in the shape of a cylinder with conductive portions therein. The socket is a hollow cylinder designed to accept the male and containing corresponding conductive portions. The opening of the socket contains the ground conductor. Any item placed in the socket must touch the ground thus reducing risk of electric shock.

In these respects, the electrical socket and plug according to the present invention substantially departs from the conventional concepts and designs of the prior art, and in so doing provides an apparatus primarily developed for the purpose of delivering electrical current in a safer manner by grounding the entrance of the socket.

SUMMARY OF THE INVENTION

In view of the foregoing disadvantages inherent in the known types of electrical female and male connector assemblies now present in the prior art, the present invention provides a new electrical socket and plug construction wherein the same can be utilized for delivering electrical current in a safer manner by grounding the entrance of the socket.

The general purpose of the present invention, which will be described subsequently in greater detail, is to provide a new electrical socket and plug apparatus and method which has many of the advantages of the electrical female and male connector assemblies mentioned heretofore and many novel features that result in a new electrical socket and plug which is not anticipated, rendered obvious, suggested, or even implied by any of the prior art electrical female and male connector assemblies, either alone or in any combination thereof.

To attain this, the present invention generally comprises a male member a female member having an open end adapted to receive the male member. The male member is an elongate cylinder having a first and second end, the first end having a bore therethrough. The cylinder is made of sections of conducting material divided by sections of non-conducting material wherein there are three discrete sections of conducting material. The first discrete section is closest to the second end, the second section is between said first and third sections, said third discrete section is closest to said bore.

A cord containing a ground conductor and a power conductor. The power conductor being divided into a negative lead and a positive lead. The cord being inserted into the bore. The ground conductor being connected to third discrete section. The negative lead being connected to said second discrete section. The positive section being connected to said first discrete section.

A female ground conductor and a female power conductor. The female power conductor being divided into a positive lead and a negative lead. The conductors being affixed to inner surface of the female member. The conductors located such that they simultaneously are juxtaposed to and in contact with corresponding male discrete sections when the male member is inserted into female member. The ground conductor being located adjacent to the open end of the female member. The ground conductor having of an upper and lower portion. The portions being attached diametrically to inside surface of the female member such that the portions touch and are bent away from female member opening.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new electrical socket and plug apparatus and method which has many of the advantages of the electrical female and male connector assemblies mentioned heretofore and many novel features that result in a new electrical socket and plug which is not anticipated, rendered obvious, suggested, or even implied by any of the prior art electrical female and male connector assemblies, either alone or in any combination thereof.

It is another object of the present invention to provide a new an electrical socket and plug which may be easily and efficiently manufactured and marketed.

It is a further object of the present invention to provide a new electrical socket and plug which is of a durable and reliable construction.

An even further object of the present invention is to provide a new electrical socket and plug which is susceptible of a low cost of manufacture with regard to both materials and labor, and which accordingly is then susceptible of low prices of sale to the consuming public, thereby making such electrical socket and plug economically available to the buying public.

Still yet another object of the present invention is to provide a new electrical socket and plug which provides in the apparatuses and methods of the prior art some of the advantages thereof, while simultaneously overcoming some of the disadvantages normally associated therewith.

Still another object of the present invention is to provide a new electrical socket and plug for delivering electrical current in a safer manner by grounding the entrance of the socket.

Yet another object of the present invention is to provide a new electrical socket and plug which is easier to use than a standard socket and plug assembly which incorporates two prongs.

Still yet another object of the present invention is to provide a new electrical socket and plug that protects children from electrocution.

Even still another object of the present invention is to provide a new electrical socket and plug that can be used for 110 volt AC and higher voltage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
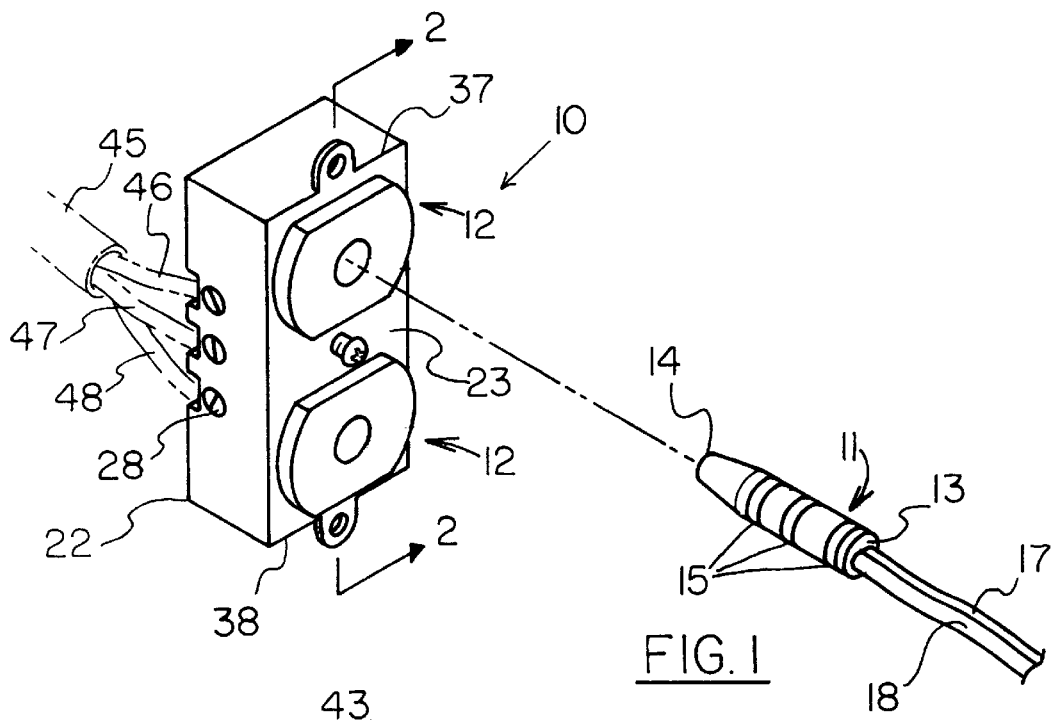
FIG. 1 is a schematic perspective view of a new electrical socket and plug according to the present invention.

With reference now to the drawings, and in particular to FIGS. 1 through 4 thereof, a new electrical socket and plug embodying the principles and concepts of the present invention and generally designated by the reference numeral 10 will be described.

As best illustrated in FIGS. 1 through 4, the electrical socket and plug 10 generally comprises a male member 11 and a female member 12 having an open end adapted to receive said male member.

The male member is an elongate cylinder having a first 13 and second 14 end. The first end has a bore 68 therethrough, the second end having a frusto-conically shaped tip whereby the tip is adapted to enter the female member. The cylinder is made of sections of conducting material 15 divided by sections of non-conducting 16 material wherein there are 3 discrete sections of conducting material. The first discrete section is closest to the tip, the second section is between the first and third sections and generally at a distance midway between the first and second ends, the third discrete section is closest to the bore 68.

A cord 19 contains a first ground conductor 17 and a power conductor 18. The power conductor is divided into a negative lead 20 and a positive lead 21. The cord is inserted through the bore. The ground conductor is connected to third discrete section. The negative lead is connected to the second discrete section. The positive section being connected to the first discrete section.

A rectangular box 22, also known as a housing, has front 23 and back 24 vertical sides. The box has an upper and lower half, the box containing three cavities 25 located in back of box, the cavities having an opening 26 adjacent and perpendicular to the back of box, the cavities being adapted to receive a positive lead, a negative lead and a ground conductor. The cavities each have a bore therethrough 27, and each bore contains a screw 28.

Two female members 12 are contained within the box. The female members form an elongate hollow cylinder with a first 30 and second end 31. The first end is the open end and the second end being a hollow frusto-conical tip adapted to receive the male tip. The second end is adjacent to the back side of the box. The female members have a first 33 and second ring 32 therein which together form the term Power Conductor. The first ring is nearer to the hollow tip. The rings have an inner circumference equal to the inner circumference of the male member 11. The rings are located such that the rings are aligned with the first and second male conducting sections when the male member is axially aligned with and inserted fully into the female member. The female members are positioned axially perpendicular to the front and back sides of the box, with one female member being located in the top half of box, and one female member is located in the bottom half of box. Each female member is centrally located in their perspective half box.

A tab 34 is connected to each ring. The tab extends away from the center of the ring, extending beyond the outside perimeter of the hollow cylinder.

The front vertical side 23 defines a vertical face plate portion, hereinafter referred to as a face plate, is integrally coupled to the box. The face plate may receive a screw 36 for a conventional cover, not shown. The face plate has a top 37 and bottom edge 38. The face plate has an upper and lower half each containing an outwardly extending vertical portion 39 containing a circular bore therethrough 40, each of the bores are aligned with a female member. A third bore 41 is placed in the horizontal and vertical midpoint of the face plate to receive the screw.

A first 42 and second tab 43 extend vertically away from the face plate. The first tab is located at the midpoint of the bottom edge and the second tab is located at the midpoint of the top edge each of the tabs having a bore 44 therethrough.

A power source 45 for the female member containing a power conductor and second ground conductor 46. The power conductor is divided into a negative lead 47 and a positive lead 48. The cavities 25 are divided into a ground cavity 49, a negative cavity 50 and a positive cavity 51. The ground conductor is connected to the ground cavity 49, the negative lead is connected to the negative cavity 50, and the positive lead is connected to the positive cavity 51.

Figure 2:
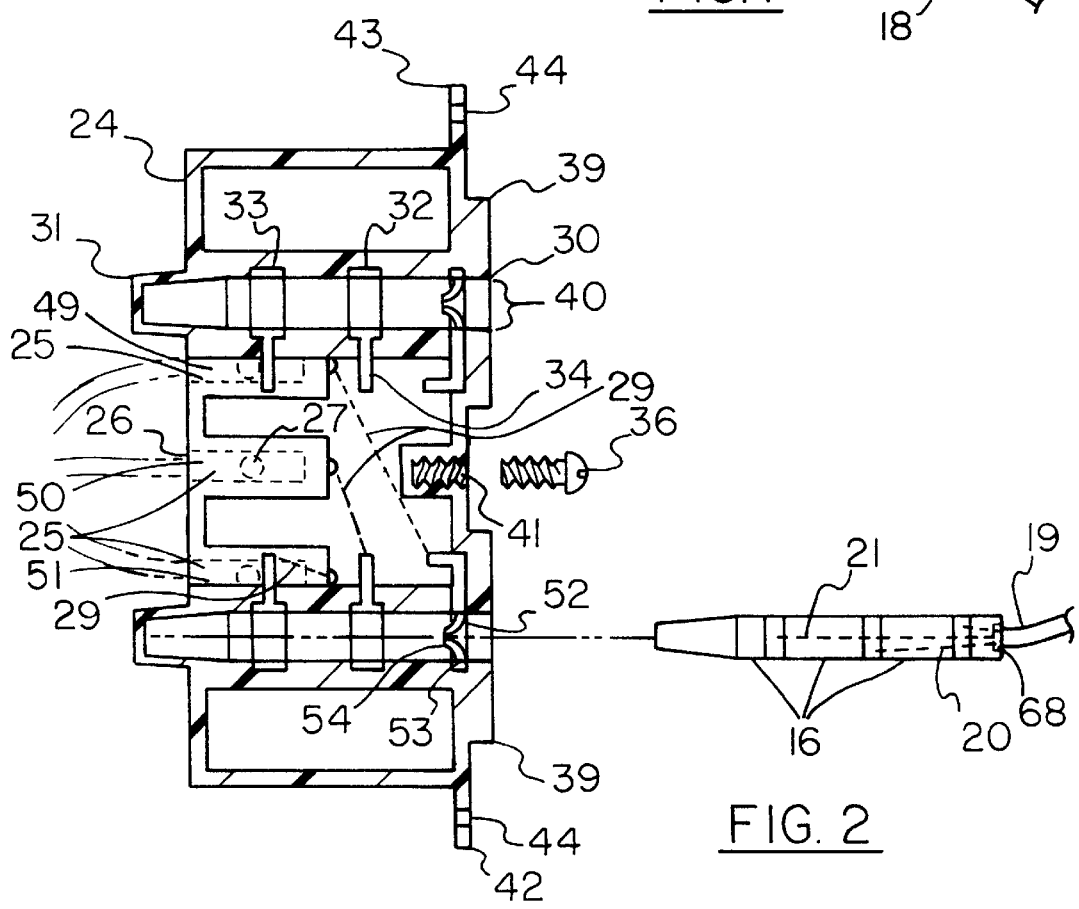
FIG. 2 is a schematic view along line 2—2 of the present invention.

A third ground conductor 52 is located adjacent to the open end of the female member and connected to the ground cavity. The third ground conductor 52 is comprised of an upper and lower portion. Each portion has a base 53 and a tip 54. Each portion has a height greater than ½ the height of the female cylinder. The bases are attached opposite to each other to inside surface of the female cylinder such that the tips touch and are bent toward the female member tip. The upper and lower portions of the third ground conductor 52 must have a height greater than one-half of the height of the female cylinders such that the tips 54 of the upper and lower portions of the third ground conductor 52 touch and bend inward as is depicted in FIG. 2. The ground conductor portions are located so as to become aligned with the male ground conductor section when the male member is inserted fully into the female member. When inserted, the ground conducting portions are biased against the male member.

Wires 29 attach the conducting tabs and the ground portion to their corresponding cavities 25.

Figure 3:
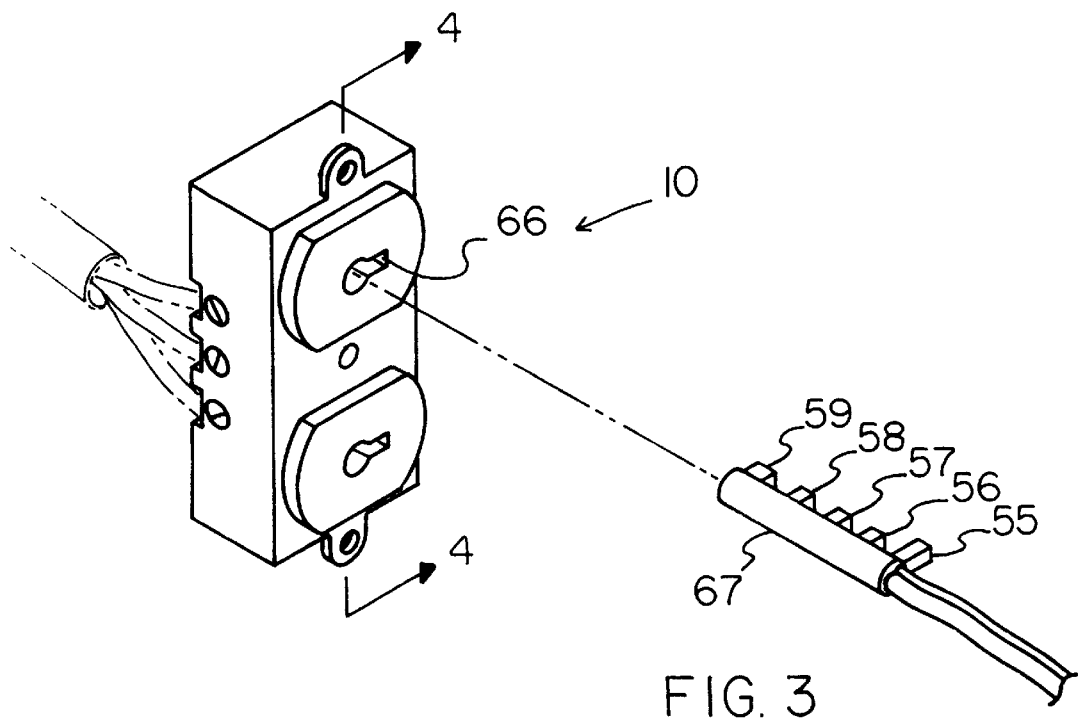
FIG. 3 is a schematic perspective view representing another embodiment the present invention.
Figure 4:
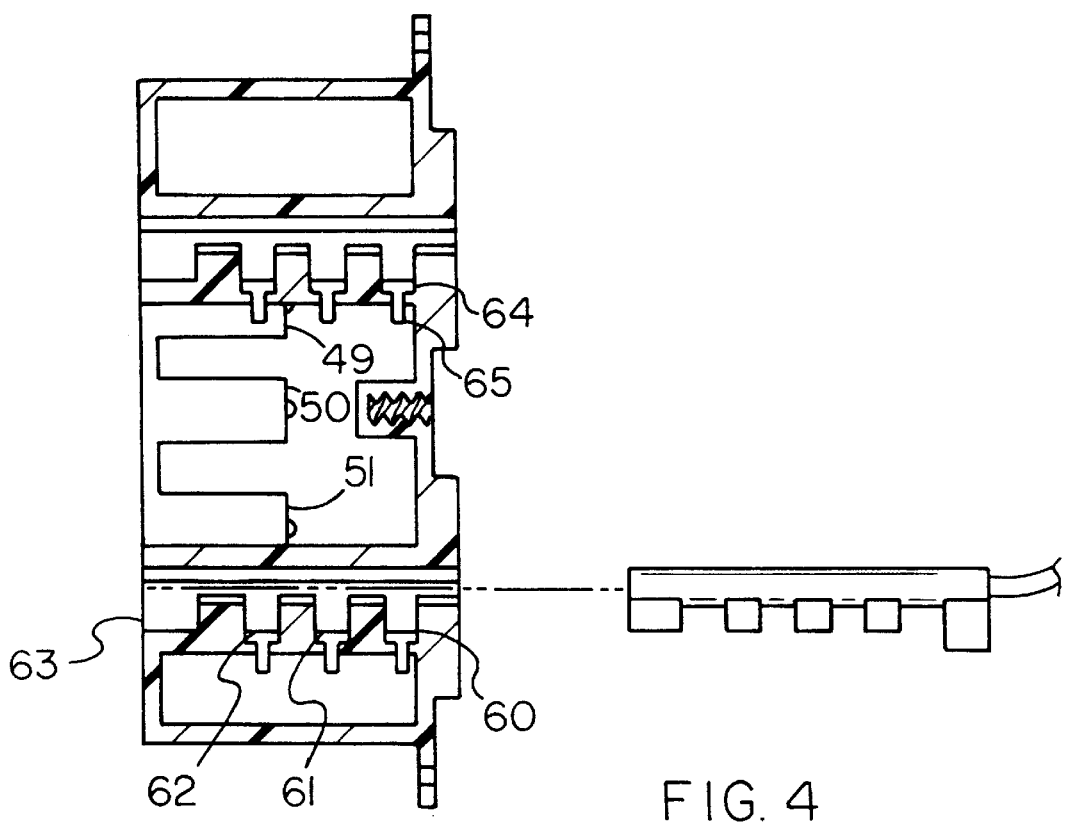
FIG. 4 is a schematic view along line 4—4 of another embodiment of the present invention.

In the second embodiment of the present invention, there are some minor, though significant, variations. The second embodiment of the invention, as presented in FIG. 3 and FIG. 4 show a male member wherein the sections are ridges. The male member has five rectangular ridges 55–59 extending upwardly and out of the cylinder, and no frusto-conical tip. The ridges are placed equidistant from each other in a straight line across the length of the cylinder. The ridges are numbered in consecutive order wherein the first ridge 55 is the ridge adjacent to the first end. The second through fourth ridges 56–58 comprise a conducting material and correspond to the conducting materials found in the first embodiment of the male member.

In the second embodiment, the two female members have four indentations 60–63 extending downward from the axis into the surface of the hollow cylinder. The indentations are consecutively numbered one through four, whereby the first indentation 60 is nearest to the open end. The indentations have locations and dimensions so as to receive the second 56 through fifth 59 ridges. The indentations one 60 through three 62 have conducting portions 64 wherein such portions will come in contact with the male member second through forth ridges when the male member is inserted fully into the female member and rotated along its axis to juxtapose the ridges with the indentations. A conductive tab 65 is connected to each individual conductive portion in the indentation. Because the male member utilized is shaped as a key, there is no need for the female ground to be comprised of two portions biased against each other.

Finally, in the second embodiment, the bores 66 are shaped like a key hole to receive the male member.

In use, the male member 11 is preferably a cylinder with conductive portions 15 therein. A cord 19 is attached to the conductive portions through a bore in the male member. The cord ran contains a power conductor and a ground conductor which are connected to the conductive sections/portions of the male member. The important aspect being that the ground is attached to the conductive portion closest to where the cord first enters the male member. The female member 12, is a hollow cylinder with female power conducting rings 32, 33 which correspond to the male member power conducting sections such that when the male member is inserted into the female member, the female conductive rings are juxtaposed with the male correspondingly charged conductive sections. The opening of the female member has a ground conductor 52. The ground conductor consists of two portions which are mounted opposite each other such that their ends 54 touch. The ends are bent inward away from the opening. This feature accomplishes two goals. First, any object that may be placed within the female member must be touching the ground conductor thus decreasing the risk of electric shock. Second, by having the members touch, they are biased against each other and will hold the male member in place when it is inserted. A power supply 45 is attached to the rings and the ground. The male member is inserted fully into the female member. The conductive materials become aligned and power is transferred from the female member to the male member.

The second embodiment functions in same manner as the first only a key shaped male member 67 is utilized. The conducting sections become three middle ridges 56, 57, 58. There are two more edges 59, 55 on either end of the male member. The male member is inserted into the female member and turned clockwise so that they are inserted at 3 o'clock and rest at 6 o'clock. The outside ridge 55 does not enter the female member but acts more as a grip and a biasing means. The innermost ridge 59 is used for holding the male member in place. The female member has indentations 60–63 or notches instead of rings. The lowermost portions 64 of these indentations contain conductive material which will be aligned with and touching the male conductive ridges when the key is turned to 6 o'clock.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electrical plug and socket assembly comprising:

a male member;

a female member having an open end adapted to removably receive said male member, said female member forming an elongate hollow cylindrical chamber with a first and second end, said first end forming said open end;

the male member being an elongate cylinder having a first and second end, said first end having a bore therethrough, said cylinder being made of sections of conducting material divided by sections of nonconducting material wherein there are three discrete sections of conducting material, said first discrete section being closest to said second end, said second section being between said first and third sections, said third discrete section being closest to said bore;

a cord containing a first ground conductor and a power conductor, said power conductor being divided into a negative lead and a positive lead, said cord being inserted into said bore, said first ground conductor being connected to said third discrete section, said negative lead being connected to said second discrete section, said positive section being connected to said first discrete section;

a power source for the female member containing a second ground conductor and a female power conductor, said female power conductor being divided into a positive lead and a negative lead; each of said leads from said female power conductor being operationally coupled to a ring located in said female member, said rings being located such that they simultaneously are juxtaposed to and in contact with corresponding male discrete sections when said male member is inserted into female member, said second ground conductor being operationally coupled to a third ground conductor, said third ground conductor being generally located adjacent to the open end of said female member, said third ground conductor having an upper portion and a lower portion, said upper and lower portions being attached at diametrically opposite locations of an inside surface of said female member adjacent said open end such that said upper and lower portions touch each other, said upper and lower portions being bent away from the open end of said female member and out of contact with each other when said male member is removably inserted into said female member.

2. The assembly of claim 1 further comprising a frusto-conically shaped tip formed on said second end of said male member whereby said tip is adapted to enter said female member.

3. The assembly of claim 1 further comprising:

a housing comprised of:
  a rectangular box, said box having a vertical planar face plate portion, a vertical planar back, a horizontal planar top, a horizontal planar bottom, and two vertical planar sides, said box having a top and bottom half;
  three cavities extending into said back of box, said cavities extending parallel to said top of said box, said cavities being adapted to receive said leads from said female power conductor and said second ground conductor;
  two female members extending into said face plate portion.

4. An electrical plug and socket assembly comprising:

a male member;

a plurality of female members each having an open end adapted to removably receive said male member;

the male member being an elongate cylinder having a first and second end, said first end having a bore therethrough, said cylinder having five rectangular ridges extending upwardly and out of said cylinder, said ridges placed equidistant from each other in a straight line across the length of said cylinder, said ridges being numbered in consecutive order wherein the first ridge is the ridge adjacent to said first end, said second through forth ridges being conducting material;

a cord containing a first ground conductor and a power conductor, said power conductor being divided into a negative lead and a positive lead, said cord being inserted through said bore, said first ground conductor being connected to said second ridge, said negative lead being connected to said third ridge, said positive lead being connected to said forth ridge;

a housing, said housing having a vertical planar face plate portion, a vertical planar back, a horizontal planar top, a horizontal planar bottom, and two vertical planar sides, said face being open, said housing having a top and bottom half;

three cavities extending into said back of said housing, each of said cavities having an opening adjacent to said back side of said housing, said cavities extending parallel to said top of housing;

a power source for said female members, said power source containing a power conductor and a second ground conductor, said power conductor for said power source being divided into a negative lead and a positive lead, said second ground conductor being connected to said ground cavity, said negative lead being connected to said negative cavity, said positive lead being connected to said positive cavity;

wherein said plurality of female members is two female members, each of said female members comprising;
  an elongate hollow cylinder with a first and second end, the first end being said open end, said second end being adjacent to back side of said box, said female members having four indentations extending downward from said axis into the surface of said hollow cylinder, said indentations being consecutively numbered one through four, said first indentation being nearest to said open end, said indentations having locations and dimensions so as to receive said second through fifth ridges, said indentations one through three having conducting portions therein, wherein said conducting portions may come into contact with said second through fourth ridges on said male member when said male member is inserted fully into said female member and turned to juxtapose said ridges with said indentations, said female members being positioned axially perpendicular to said front face plate portion of said box, one of said female members being located in said top half of box, one of said female members being located in said bottom half of box; and a plurality of tabs, each of said tabs being conductive, each of said tabs being connected to one of said individual conductive portions in said indentations, said tabs extending away from the center of said hollow cylinder and beyond the perimeter of said hollow cylinder, the lab connected to said conductive portion in said first indentation being connected to said ground cavity, the tab connected to said conductive portion in said second indentation being connected to said negative cavity, the tab connected to said conductive portion in said third cavity being connected to said positive cavity.

5. An electrical plug and socket assembly comprising;

a male member;

a female member having an open end adapted to removably receive said male member;

the male member being an elongate cylinder having a first and second end, said first end having a bore therethrough, said second end having a frusto-conically shaped tip such that said tip is adapted to enter said female member, said cylinder being made of sections of conducting material divided by sections of non-conducting material wherein there are three discrete sections of conducting material, a first of said discrete sections being closest to said tip, a second of said sections located at a distance midway between said first and second ends, and a third of said discrete sections being closest to said bore;

a cord containing a first ground conductor and a power conductor, said power conductor being divided into a negative lead and a positive lead, said cord being inserted through said bore, said first ground conductor being connected to said third discrete section, said negative lead being connected to said second discrete section, said positive lead being connected to said first discrete section;

a housing, said housing having a front face plate portion and a back side, said box having an upper and lower half, said box containing:

three cavities, each of said cavities being located in the said back side of said box, said cavities each having an opening adjacent and perpendicular to said back side of said box, said cavities being adapted to receive a positive lead, a negative lead and a second ground conductor from a power source, said cavities each having a bore therethrough, each bore containing a screw;

two female members being positioned in said box, each of said female members forming an elongate hollow cylinder with a first and a second end, the first end being an open end and the second end being a hollow frusto-conical tip adopted to receive said male tip, said second end being adjacent to the back side of said box, said female members having a first and second ring therein, said first ring being positioned nearer to said hollow tip, said rings having an inner circumference substantially equal to the circumference of said male member, said rings being located such that said rings are aligned with said first and second male conducting sections when said male member is axially aligned with and inserted fully into said female member, said female members being positioned axially perpendicular to said front and back sides of said box, one of said female members being located in said top half of box, one female member being located in said bottom half of box, each female member being centrally located in their respective half box;

a tab being connected to each ring, said tab extending away from the center of said ring, said tab extending beyond the outside perimeter of said hollow cylinder;

said face plate portion having a top and bottom edge, said face plate portion having an upper and lower half, each of said halves containing an outwardly extending vertical portion containing a circular bore therethrough, each said bores being aligned with one of said female members, a third bore being located in the horizontal and vertical midpoint of the face plate to receive a screw;

a first and a second tab each extending vertically away from the face plate, said first tab being located at the midpoint of said bottom edge, said second tab being located at the midpoint of said top edge, each of said tabs having a bore therethrough;

a power source for the female member containing a power conductor and a second ground conductor, said power conductor being divided into a negative lead and a positive lead, said second ground conductor being connected to said ground cavity, said negative lead being connected to said negative cavity, said positive lead being connected to said positive cavity; and a third ground conductor being located adjacent to the open end of said female member and connected to said ground cavity, said third ground conductor having an upper portion and a lower portion, each portion having a base and a tip, each portion having a height greater than ½ the height of the female cylinder, said bases being attached in opposition to each other on diametrically opposite locations of an inside surface of said female cylinder such that said tips touch each other to close said open end, said upper and lower portions being bent away from the open end of said female member and out of contact with each other when said male member is removably inserted into said female member, said ground conductor portions being located so as to become aligned with said male ground conductor section when said male member is inserted fully into said female member, said ground conducting portions being biased against said male member.

* * * * *